United States Patent [19]
Verne

[11] 4,150,569
[45] Apr. 24, 1979

[54] LEVEL INDICATOR FOR LIQUID CONTAINED IN A RESERVOIR

[75] Inventor: Michel Verne, Aubervilliers, France

[73] Assignee: Societe Anonyme DBA, Paris, France

[21] Appl. No.: 851,223

[22] Filed: Nov. 14, 1977

[30] Foreign Application Priority Data

Nov. 26, 1976 [FR] France ............................... 76 35710

[51] Int. Cl.² ...................... G01F 23/14; G01F 23/16
[52] U.S. Cl. ..................................................... 73/302
[58] Field of Search ............. 73/302, 249; 116/118 R, 116/114 PV; 137/558, 804

[56] References Cited

FOREIGN PATENT DOCUMENTS 1002145  2/1957  Fed. Rep. of Germany ............. 73/302
1249550  9/1967  Fed. Rep. of Germany ............. 73/302
1805479  6/1970  Fed. Rep. of Germany ............. 73/302

Primary Examiner—S. Clement Swisher
Assistant Examiner—Denis E. Corr
Attorney, Agent, or Firm—Leo H. McCormick, Jr.; Ken C. Decker

[57] ABSTRACT

A level indicator for monitoring liquid contained in a reservoir. The indicator comprises a tubular probe which has one end immersed in the liquid and the other end connected to an inlet orifice to a gas-filled chamber in a housing. The gas-filled chamber is connected to a liquid column manometer and an external gas reserve. A valve is located in the inlet orifice to control communication between the gas filled chamber and the probe. A venting duct controls the development of a pressure drop in the gas-filled chamber to establish a permanent connection between the gas reserve and probe irrespective of the position occupied by the valve.

17 Claims, 2 Drawing Figures

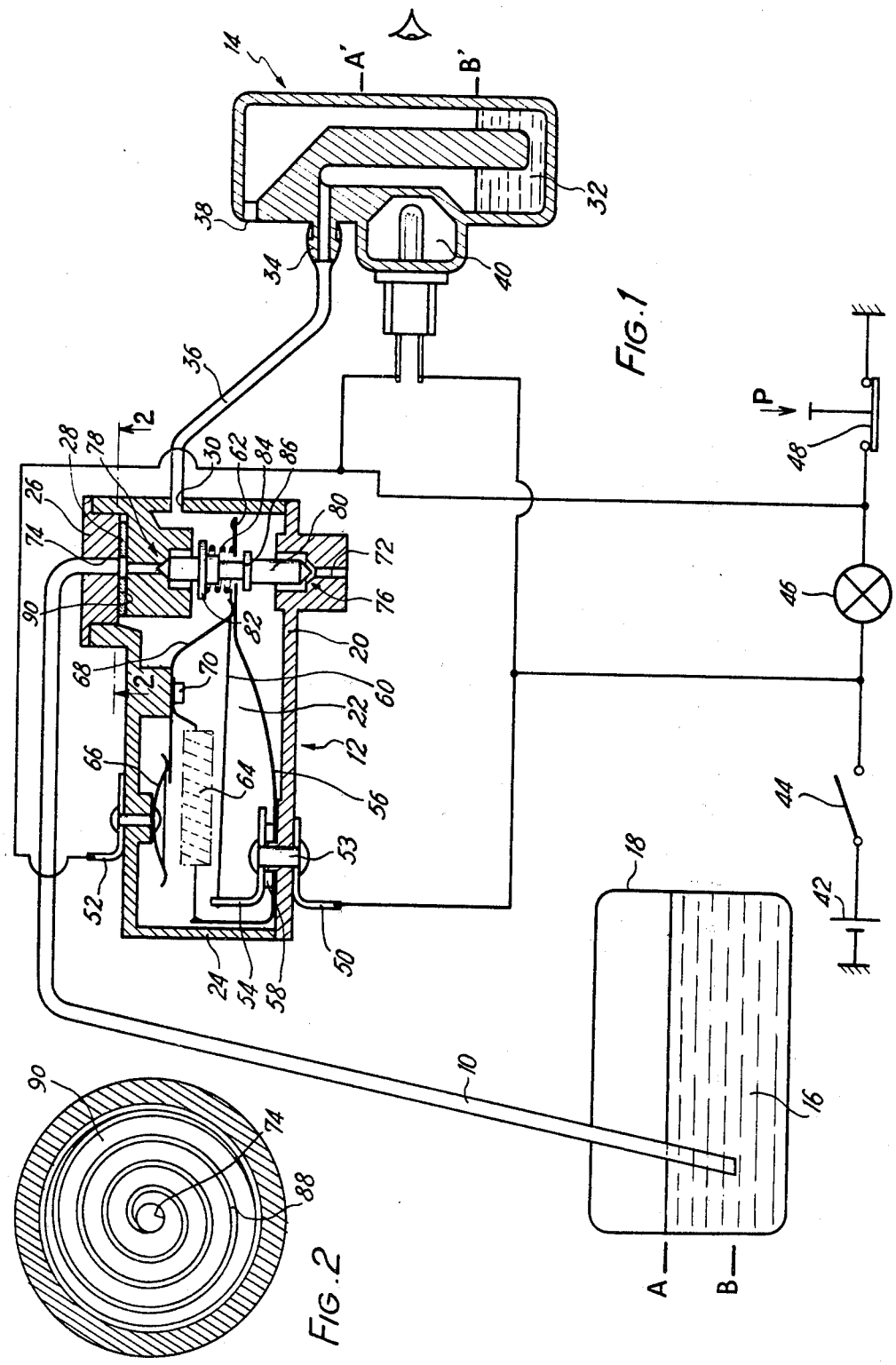

LEVEL INDICATOR FOR LIQUID CONTAINED IN A RESERVOIR

BACKGROUND OF THE INVENTION

The invention relates to a level indicator for liquid contained in a reservoir, and more particularly for the oil level in the sump of an internal combustion engine.

More particularly, the invention relates to a level indicator for liquid contained in a reservoir of the type comprising a probe for immersion in the liquid, a gas pressure with a heating resistance and a liquid column manometer. The gas pressure source comprising a housing containing a gas-filled chamber which communicates with an external gas reserve by way of a filling orifice, with the probe by way of an inlet orifice, and with the manometer by way of a measuring orifice. Communication between the chamber and the probe is controlled by a first valve situated in the inlet orifice.

In level indicators of this type, the probe is usually a tube of which one end is immersed in the liquid whose level is to be monitored. The general principle underlying this type of indicator is that the liquid in the probe is expelled until a pressure equilibrium is reached. This pressure equilibrium corresponds to the liquid level above the end of the probe, and it is measured by means of the liquid column manometer.

When a probe of this type is used to measure the oil level in the sump of an internal combustion engine, running of the engine heats the ambient air and in particular the air trapped in the immersed tube. This heating expands the air enclosed in the tube, causing a portion of the air to escape from the tube in the form of bubbles inside the crankcase. If, however, the engine is switched off for a long time and cools, for example overnight or when the vehicle is unused over a long period, the air trapped in the immersed tube contacts and occupies a smaller volume than it did when the engine was running. The oil level in the tube thereafter rises substantially and irreversibly, since the valve connecting the tube to the interior of the gas pressure source is closed. This means that when the engine is started again the first oil level reading after starting is incorrect.

SUMMARY OF THE INVENTION

To overcome this disadvantage, the invention proposes a level indicator having a venting duct to establish a permanent connection between the gas filled chamber and probe irrespective of the position occupied by the valve. The venting duct controls a pressure drop between the chamber and the probe to prevent fluid from rising in the probe above the fluid level in the reservoir.

It will be readily appreciated that a duct of this kind enables the disadvantage mentioned to be overcome, since it enables equilibrium to be reached between the pressure in the immersed tube and the pressure in the chamber defined by the gas pressure source after prolonged stopping of the engine. Also, the pressure drop produced by the venting duct is large enough not to reduce the vacuum which normally prevails in the crankcase when the engine is running.

BRIEF DESCRIPTION OF THE DRAWINGS

FIG. 1 diagrammatically illustrates a level indicator embodying the invention, partly in section; and FIG. 2 represents a section along a line 2—2 in FIG. 1.

DETAILED DESCRIPTION OF THE INVENTION

The level indicator illustrated diagrammatically in FIG. 1 comprises a probe 10, a gas pressure source 12 and a manometer 14. The probe 10 comprises a tube which is immersed in liquid 16 contained in a reservoir 18, for example the sump of a motor vehicle engine. The pressure source 12 comprises a housing 20 having a gas-filled chamber 22, the gas being air in the embodiment illustrated. The housing 20 is preferably of moulded, electrically insulating synthetic plastic material, and it comprises at least one principal portion 24, an insert portion 26 and a sealing element 28. With the exception of the sealing element 28, which is preferably of elastomeric material such as rubber, the housing portions are preferably, but not necessarily, ultrasonically welded. The chamber 22 communicates freely and permanently with the manometer 14 by way of an orifice 30.

The manometer, which is of a known type, has a U-tube for storing a quantity of barometric liquid 32. One limb 34 of the U-tube is connected by a hose 36 to the orifice 30, and the other limb 38 is connected to atmosphere. The housing of the manometer 14 is of translucent synthetic plastic material and preferably contains a lamp 40 to facilitate reading. In addition, the manometer is designed to be installed in the driver's compartment of the vehicle and bears a number of graduations such as A' and B' in order to give the driver a quantitative indication of the oil level in the sump.

The level indicator also comprises an electrical operating circuit preferably associated with the circuit for monitoring the engine oil pressure. This monitoring circuit comprises a direct-current voltage source 42 (preferably the accumulator battery of the vehicle), an ignition switch 44, a warning light 46 and an oil pressure switch 48, of any known type, connected in series between the warning light 46 and the vehicle's earth. The lamp 40 in the manometer 14 and two terminals 50, 52 provided on the housing 20 of the gas pressure source 12 are connected in parallel with the warning light 46. The terminal 50, termed the input terminal, is attached to an anchoring bracket 54 in chamber 22 by a rivet 53 fixed to the housing 20. A resilient metal leaf spring 56 which is located between the housing 20 and the anchoring bracket 54 is electrically insulated from rivet 53 by an extension 92 of the housing 20 and from the anchoring bracket 54 by an insulating washer 58. A heating wire 60 is mounted between the free end 94 of the anchoring bracket 54 and the free end 62 of the leaf spring 56. A heating resistance 64 is connected in series with the heating wire 60 and leaf spring 56 between the input terminal 50 and the output terminal 52. For safety reasons, protection means 66 are provided between the heating resistance 64 and the output terminal 52 to protect the electrical circuit inside the gas pressure source in the event of the circuit is continuously on.

The protection means 66 comprise a dished washer which responds to a temperature rise due, for example, to a prolonged application of voltage to the circuit by opening the circuit, preventing damage to the level indicator. Also, a tongue 68 which is mounted on a stud 70 in the housing 20 has a first end 96 which connects the heating resistance 64 to the dished washer 66 and a second end 96 which connects the leaf spring 56 to the dished washer protection means 66. The tongue 68 allows the leaf spring 56 and heating resistance 64 to be connected in parallel under certain conditions, described in more detail below.

A filling orifice 72 and an inlet orifice 74 formed in the housing 20 connect the chamber 22 to the atmosphere and to the probe 10 respectively. The orifice 72, 74 are axially aligned, and the gas flow through the respective orifices is controlled by a first valve 76 associated with the filling orifice 72 and a second valve 78 associated with the inlet orifice 74. The valves 76, 78 are mounted back-to-back and essentially comprise a spool 80 which is slidable in the housing 20, and whose conical ends 100 and 102, respectively, cooperate with respective conical valve seats formed in the housing 20. The orifices 72, 74 are designed to admit gas when the corresponding end of the spool 80 is clear of its seat. A return spring 84 has a first end 104 which bears on collar 82 on spool 80 and a second end 106 which bears on end 62 of the leaf spring 56. When the level indicator is idle, the return spring 84 urges conical end 102 of valve 78 into fluid tight contact with its seat in inlet orifice 74 at the same time conical end 104 of valve 76 is held off its seal in filling orifice 72 through the interaction of leaf spring 56 and return spring 84. To ensure that the valve 78 is fluid-tight in the idle position, the heating wire 60 is tensioned when idle so that the end 62 of the leaf spring 56 is disengaged from a second collar 86 on the spool 80.

In accordance with the invention, a venting duct 88 (FIG. 2) is provided as a permanent connection between the probe 10 and chamber 22, irrespective of the position occupied by the valve 78. The venting duct 88, in the embodiment illustrated, has a spiral groove formed in that surface 90 of the housing portion 26 which adjoins the sealing washer 28. Groove 88 connects orifice 74 to chamber 22. The length and cross-section of the groove 88 define a controlled pressure drop, and the sealing washer 28 ensures that this pressure drop is accurately known.

MODE OF OPERATION OF THE INVENTION

When idle, that is, when the vehicle's engine is not running, the various components of the level indicator are in the positions illustrated in FIG. 1. When the driver of the vehicle switches on the ignition, the switch 44 closes to allow current to flow to lamps 40 and 46, since the oil pressure switch 48 is also closed. The Circuit inside the gas pressure source 12 is now switched to the parallel condition since the free end 98 of tongue 68 contacts leaf spring 56 to short circuit the electrical flow path from end 62 of the leaf spring 56 through the heating resistance 64 to stud 70. In this situation, electrical current flow from the inlet terminal 50 to the outlet terminal 52 on the flow path through rivet 53, anchoring bracket 54, heating wire 60, tongue 68, and protection means 66. This feature enables the efficiency of the pressure source to be increased, because it prevents the air from being heated until closure of the valve 76 which controls the connection between the chamber 22 and atmosphere through the filling orifice 72. Also, this feature enables the intensity of the current flowing through the wire 60 to be increased. The rapid lengthening of the wire 60 due to its heating allows spring 84 to urge end 62 of the leaf spring 56 into contact with the collar 86, to break the contact between the end 98 of the tongue 68 and the end 62 of the leaf spring 56. At the same time with the tension released from leaf spring 56, the weight of spool 80 moves conical end 100 of valve 76 onto its seat in the filling orifice 72 to close chamber 22 from the atmosphere and conical end 102 of valve 78 off its seat in inlet orifice 74 to open the flow path between probe 10 and chamber 22. Under these conditions, the electrical circuit inside the gas pressure source 12 is in series with current flowing from inlet terminal 50 to outlet terminal 52 through the heating wire 60, leaf spring 56 and heating resistance 64 end 96 of tongue 68, and the dished-shaped protection means 66. Current flowing through the resistance 64 causes heating of the air inside the chamber 22, which is now connected to the probe 10 and disconnected from the atmosphere. The intensity of the current flowing through the heating wire 60 is reduced but remains high enough to maintain the expansion of the wire so as not to modify the positions of the valves 76, 78. Heating of the gas in the chamber 22 causes a rise in pressure which is transmitted to the probe 10 by way of the valve 78 and inlet orifice 74. As a result, the gas in probe 10 expands and expels the liquid from the probe until gas bubbles escape through the liquid from the probe 10 inside the reservoir 18. The pressure in the chamber 22 of the pressure source 12 can now be regarded as substantially equal to the pressure prevailing in the liquid 16 at the level where the probe 10 ends in the reservoir 18. This level corresponds to a depth of liquid substantially equal to the distance A-B shown in FIG. 1.

Simultaneously, the pressure prevailing in the chamber 22 is transmitted to the measuring orifice 30 by hose 28 to the limb 34 of the U-tube of the manometer 14. This pressure produces a rise in the liquid contained in the manometer limb 38 open to the atmosphere and gives a visual indication of the liquid level in the reservoir 18. When the driver starts the engine, the pressure rise in the oil circulation system urges the pressure switch 48 in the direction indicated by the arrow P in FIG. 1, opening the electrical circuit supplying lamps 40 and 46 in the electrical circuit inside the pressure source 12. Thereafter the wire 60 therefore cools and contracts until it urges the spool 80 back into the position illustrated in FIG. 1, to disconnect the chamber 22 from the inlet orifice 74 and reconnecting the chamber 22 to the atmosphere by way of the orifice 72 to restore the initial volume of air inside the chamber 22.

As previously stated, if for any reason the heating resistance 64 were left on too long, heating of the dished washer 66 causes the dished-shaped washer 66 to expand and open the electrical circuit to be opened, preventing damage to the level indicator.

When the engine is inoperative for a long time, the gas contained in the probe 10 cools and contracts so that the liquid level inside the probe is liable to rise above the liquid level in the reservoir 18 and cause a measuring error when the ignition switch 44 is next closed. This disadvantage is avoided by means of the invention owing to the venting duct 88 which allows restoration of a normal volume of gas inside the probe 10 when the vehicle is stationary. Moreover, the venting duct 88 defines a high enough pressure drop not to reduce the vacuum which normally prevails in the sump 18.

It will be appreciated that without exceeding the scope of the invention the filling orifice 72 may communicate with an external gas reserve other than the atmosphere. Also, the particular arrangement of the means for operating the valves 76, 78 due to heating and the arrangement of the valves themselves, may be modified without exceeding the scope of the invention.

Furthermore, the venting duct 88 may be completely different, both in its position, which may, for example, be at the seat of the valve 78 or the corresponding ends of the spool 80, and in its shape, which may differ from the spiral shape described by way of example. Alternatively, of course, the venting duct may be outside the pressure source 12, directly between the probe 10 and atmosphere (or the external gas reserve if this is not the atmosphere).

I claim:

1. A level indicator for liquid contained in a reservoir, comprising:
   a gas pressure source including a housing defining a gas-filled chamber,
   a heating resistance provided in said chamber to heat the gas filling said chamber;
   an external gas reserve communicating with said chamber through a filling orifice in the housing;
   probe means for connecting the reservoir to said chamber through an inlet orifice in the housing, said probe means being immersed in the liquid in the reservoir;
   a liquid column manometer communicating with the chamber through a measuring orifice in the housing;
   first valve means provided in said inlet orifice to control communication between the probe means and said chamber; and
   a venting duct for establishing a permanent connection between the gas-filled chamber and the probe means to provide a controlled pressure drop between the gas-filled chamber and probe means and prevent liquid in the reservoir from rising in the probe above the liquid level in the reservoir.

2. The level indicator of claim 1, wherein in the reservoir:
   said venting duct is formed in the housing to render communication between the probe means with the gas-filled chamber.

3. The level indicator of claim 1, wherein:
   said venting duct comprises at least one groove formed in said housing, the length and cross-section of said groove defining the controlled pressure drop.

4. The level indicator of claim 3, wherein:
   said groove forms a spiral which interconnects the inlet orifice and the gas-filled chamber.

5. The level indicator of claim 1, further comprising:
   control means for operating the first valve means, said control means including;
   a heating wire of which one end is connected to the housing; and
   a leaf spring attached to the housing and to the other end of the heating wire to move the latter in response to variations of the length of said wire, movement of said other end of the heating wire controlling opening and closure of the first valve means.

6. The level indicator of claim 5, further comprising:
   input and output terminals carried by the housing and electrically connected in series with the heating wire, the leaf spring and the heating resistance.

7. The level indicator of claim 6, further comprising:
   second valve means located in the filling orifice to control communication between the external gas reserve and said chamber, the first and second valve means being mounted back to back and operated simultaneously by the control means; and
   means for short-circuiting the heating resistance when the second valve means are opened.

8. The level indicator of claim 7, wherein:
   said short-circuiting means comprises an electrically conductive tongue connected to the output terminal and contacting the other end of the heating wire when the second valve means is opened.

9. The level indicator of claim 8, further comprising:
   a dished washer provided between the heating resistance and the output terminal for interrupting the electrical supply to the heating resistance when the temperature inside the control chamber exceeds a predetermined level.

10. The level indicator for liquid contained in a reservoir, comprising:
    a gas pressure source including a housing defining a control chamber;
    a heating resistance provided in said chamber to heat a gas filling said chamber;
    an external gas reserve communicating with said chamber through a filling orifice in the housing;
    a tubular probe of which one end is immersed in the liquid and of which the other end communicates with the chamber through an inlet orifice in the housing;
    a U-tube manometer of which one limb communicates with the chamber through a measuring orifice in the housing; and
    first valve means provided in said inlet orifice to control communication between the tubular probe and said chamber;
    said housing comprising a main portion in which said first valve means is located, an insert portion, and a sealing element inserted between the said main portion and said insert portion, aid inlet orifice extending through said main and insert portions and the sealing element;
    said insert portion having a groove located thereon adjacent said sealing element, said groove and said sealing element forming a duct for interconnecting the inlet orifice and the control chamber;
    said duct controlling a pressure drop between the tubular probe and the control chamber to prevent liquid from rising in the probe above the liquid level in the reservoir.

11. The level indicator of claim 10, wherein: said groove is of substantially constant cross-section and forms a spiral which interconnects the inlet orifice and the control chamber.

12. The level indicator of claim 10, wherein: the sealing element is of elastomeric material.

13. The level indicator of claim 10, further comprising:
    a second valve means located in the filling orifice to control communication between the external gas reserve and said chamber, the first and second valve means being mounted back to back; and
    control means for simultaneously operating the first and second valve means.

14. The level indicator of claim 13, wherein the control means comprise;
    a heating wire of which one end is connected to the housing;
    resilient means attached to the other end of the heating wire to move said other end in response to variation of its length, the first and second valve means being responsive to the position of said other end of the heating wire; and input and output terminals provided on the housing to electrically connect in series the heating wire, and the heating resistance.

15. The level indicator of claim 14, further comprising:
means for short-circuiting the heating resistance when the second valve means are opened;
said short-circuiting means comprising an electrically conductive tongue connected to the output terminal and contacting the other end of the heating wire when the second valve means are opened.

16. The level indicator of claim 14, further comprising:
temperature responsive means for interrupting electrical supply to the heating resistance when the temperature inside the control chamber exceeds a predetermined level.

17. The level indicator of claim 16, wherein:
the temperature responsive means comprise a dished washer connected between the heating resistance and the output terminal.

* * * * *